United States Patent
Moon et al.

(10) Patent No.: US 11,304,063 B2
(45) Date of Patent: Apr. 12, 2022

(54) DEEP LEARNING-BASED BEAMFORMING COMMUNICATION SYSTEM AND METHOD

(71) Applicant: INDUSTRY FOUNDATION OF CHONNAM NATIONAL UNIVERSITY, Gwangju (KR)

(72) Inventors: Sangmi Moon, Gwangju (KR); Hyeonsung Kim, Jeollanam-do (KR); Intae Hwang, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 0 days.

(21) Appl. No.: 17/219,203

(22) Filed: Mar. 31, 2021

(65) Prior Publication Data
US 2022/0014933 A1 Jan. 13, 2022

(30) Foreign Application Priority Data
Jul. 9, 2020 (KR) .......................... 10-2020-0084794

(51) Int. Cl.
*H04W 16/22* (2009.01)
*H04W 16/28* (2009.01)

(52) U.S. Cl.
CPC .......... *H04W 16/225* (2013.01); *H04W 16/28* (2013.01)

(58) Field of Classification Search
CPC .............................. H04W 16/225; H04W 16/28
See application file for complete search history.

(56) References Cited

U.S. PATENT DOCUMENTS

| | | | |
|---|---|---|---|
| 9,184,806 B2 * | 11/2015 | Kim .................... | H04B 7/0456 |
| 10,009,785 B2 * | 6/2018 | Kim .................... | H04B 17/382 |

(Continued)

FOREIGN PATENT DOCUMENTS

| KR | 20190069332 A | 6/2019 |
|---|---|---|
| KR | 102067114 B1 | 1/2020 |

(Continued)

OTHER PUBLICATIONS

Zhang, Zufan, and Yanbo Chen. 2017. "Position Fingerprint-Based Beam Selection in Millimeter Wave Heterogeneous Networks" Sensors 17, No. 9: 2009., 15 Pages (Year: 2017).*

(Continued)

*Primary Examiner* — Ivan O Latorre
(74) *Attorney, Agent, or Firm* — Levenfeld Pearlstein, LLC (57) ABSTRACT

Provided are a deep learning-based beamforming communication system and method, wherein in an indoor environment using millimeter wave communication, in response to reference signals transmitted from a base station to at least one user terminal, reference signal received power and location information for each user terminal location are received from each user terminal and a fingerprint DB is constructed, and from the constructed fingerprint data, a user model is constructed on the basis of reference signal received power for each user terminal location and a blockage model is constructed on the basis of reference signal received power according to each blockage located between the base station and the user terminal. Location information and data traffic are received from the at least one user terminal, a beam index of the user terminal corresponding to the received data traffic is derived from a deep neural network, and a communication channel between the base station and a user is formed with the derived beam index, (Continued)

whereby reliability and a data transfer rate are improved in an indoor communication environment.

18 Claims, 9 Drawing Sheets

(56) References Cited

U.S. PATENT DOCUMENTS

| | | | | |
|---|---|---|---|---|
| 10,134,421 B1* | 11/2018 | Sundaram | ............... | G10L 25/78 |
| 10,567,066 B2* | 2/2020 | Jeon | .................. | H04B 7/0408 |
| 10,959,109 B1* | 3/2021 | Liu | ..................... | G06N 3/04 |
| 11,026,105 B1* | 6/2021 | Moon | .................. | H04B 15/00 |
| 11,159,224 B2* | 10/2021 | Gao | ..................... | H04L 5/005 |
| 2008/0084350 A1* | 4/2008 | Uno | ..................... | H04W 76/10 |
| | | | | 342/367 |
| 2016/0344524 A1* | 11/2016 | Kim | ..................... | H04L 5/0048 |
| 2017/0026102 A1* | 1/2017 | Guo | ..................... | H04B 7/063 |
| 2018/0049141 A1* | 2/2018 | Choi | ................... | H04B 7/0695 |
| 2019/0074854 A1* | 3/2019 | Raghavan | ............ | H04B 1/3838 |
| 2019/0182614 A1* | 6/2019 | Monogioudis | ........ | G01S 5/0294 |
| 2019/0207672 A1* | 7/2019 | Arora | ................. | H04W 72/046 |
| 2019/0372644 A1* | 12/2019 | Chen | .................. | H04W 88/12 |
| 2020/0145977 A1* | 5/2020 | Kumar | ................ | H04B 7/0617 |
| 2020/0169336 A1* | 5/2020 | Modarres Razavi | ..... | G01S 5/14 |
| 2020/0314764 A1* | 10/2020 | Noh | .................... | H04W 52/146 |
| 2020/0344694 A1* | 10/2020 | Jangid | .................... | G06N 20/00 |
| 2020/0374863 A1* | 11/2020 | Lin | ..................... | H04W 72/048 |
| 2020/0412434 A1* | 12/2020 | Zhu | ..................... | H04B 17/382 |
| 2021/0160706 A1* | 5/2021 | Wu | ..................... | H04B 17/336 |
| 2021/0194545 A1* | 6/2021 | Venugopal | ........... | H04B 7/0486 |
| 2021/0258899 A1* | 8/2021 | Rofougaran | ........... | H04W 76/11 |
| 2021/0306042 A1* | 9/2021 | Bshara | ................. | H04W 16/28 |
| 2021/0329416 A1* | 10/2021 | Li | .......................... | H04W 4/029 |
| 2021/0345410 A1* | 11/2021 | Zhou | ................ | H04W 74/0833 |
| 2021/0385678 A1* | 12/2021 | Akkarakaran | ........ | H04L 5/0048 |

FOREIGN PATENT DOCUMENTS

| | | | | |
|---|---|---|---|---|
| WO | WO-2021107472 A1 * | 6/2021 | ............ | H04W 16/28 |
| WO | WO-2021112592 A1 * | 6/2021 | ............ | H04B 7/0408 |
| WO | WO-2021191176 A1 * | 9/2021 | ............ | H04L 12/24 |

OTHER PUBLICATIONS

Moon, Sangmi et al., Deep Learning-based Beam and Blockage Prediction for Millimeter-wave Indoor Environment, Journal of The Institute of Electronics and Information Engineers, Jul. 2020, pp. 3-12, vol. 57, No. 7, South Korea.

* cited by examiner

DEEP LEARNING-BASED BEAMFORMING COMMUNICATION SYSTEM AND METHOD

CROSS REFERENCE TO RELATED APPLICATION

The present application claims priority to Korean Patent Application No. 10-2020-0084794, filed Jul. 9, 2020, the entire contents of which is incorporated herein for all purposes by this reference.

BACKGROUND OF THE INVENTION

Field of the Invention

The present disclosure relates to a deep learning-based beamforming communication system and method. More particularly, the present disclosure relates to a technology for improving reliability and a data transfer rate of a communication channel by searching for and deriving an optimal beam index estimated with deep learning according to a user location in an indoor environment.

Description of the Related Art

Millimeter wave communication is one of the promising technologies that supports a high data rate for next-generation wireless communication using a frequency range, that is, a wide 25 bandwidth, capable of performing a particular function.

The millimeter wave communication enables multiple transmission and reception antennas to be integrated in a small space so it is suitable for a massive multiple-input multiple-output (MIMO) system that increases a transmission capacity and a transfer rate through several tens to several hundreds of transmission and reception antennas.

In addition, the massive MIMO system effectively improves a data transfer rate and link reliability, and improves energy efficiency and spectral efficiency by 3 times and 1 to 2 times, respectively. Using millimeter wave and massive MIMO together, their weak points are effectively overcome and their good points are fully utilized.

Unfortunately, millimeter wave has a short wavelength due to a high frequency, so there are weak points, such as attenuation of signals, and reduction in transmission distance. To solve this problem, a number of studies have been conducted to overcome a large path loss in a millimeter wave band by applying a high-directivity beamforming technology.

High-directivity beamforming improves a coverage of millimeter wave communication, but the sensitivity of signals due to narrow beams and blockages greatly affects the coverage and the reliability of millimeter wave communication.

Regarding narrow beams used to form a millimeter wave communication channel, a line of sight (LOS) link is easily blocked by humans and nearby blockages and a millimeter wave link is attenuated by 30 dB by humans. As a result, such rapid power attenuation may cause a large amount of data loss in a multi-gigabit (GB) millimeter wave channel.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing a deep learning-based beamforming communication system and method, wherein in an indoor environment where at least one user terminal and a blockage are present, fingerprint data is constructed using user location information and a beam index in which small-scale fading of reference signal received power (RSRP) between a base station and a user terminal is the maximum, a user model and a blockage model are constructed through the constructed fingerprint data, a deep neural network derives an optimal beam index on the basis of the constructed user and blockage models for a user location and data traffic, and a communication channel between the base station and the user terminal is formed with the derived optimal beam index.

According to an aspect of the present disclosure, there is provided a deep learning-based beamforming communication system including a base station; multiple small base stations installed at predetermined indoor locations and communicating with the base station; and at least one user terminal communicating with the small base stations.

The base station may include: a communication unit receiving location information and reference signal received power of the at least one user terminal via the small base stations in response to reference signals of the base station transmitted to the at least one user terminal via the small base stations; a fingerprint DB construction unit constructing fingerprint data on the basis of the location information and the reference signal received power of the at least one user terminal received by the communication unit; a user model construction unit constructing a model on the basis of a beam index for each location of the user terminal, the beam index being derived from the fingerprint data; and an optimal beam index derivation unit deriving, from a deep neural network, the beam index in which strength of the received power for each location is the maximum.

Preferably, the base station further includes a blockage model construction unit constructing a blockage model on the basis of the reference signal received power changed depending on each blockage located between the base station and the at least one user terminal.

Preferably, the reference signals are periodically transmitted from the base station to the at least one user terminal found through exhaustive search, and are transmitted on the basis of a beamforming vector.

Preferably, the beamforming vector is a beam in which small-scale fading of the reference signal received power is the maximum in a codeword of a preset codebook.

Preferably, the reference signal received power is strength of a received signal derived by receiving and measuring, by the at least one user terminal, the reference signals transmitted from the base station.

Preferably, the communication unit receives the location information and data traffic from the at least one user terminal and requests the optimal beam index derivation unit for beam index information in which small-scale fading of the reference signal received power corresponding to each location of the user terminal is the maximum.

Preferably, the communication unit forms a communication channel between the base station and the at least one user terminal on the basis of the beam index derived by the optimal beam index derivation unit.

Preferably, the fingerprint DB construction unit constructs the fingerprint data on the basis of the reference signal received power and the location information of the at least one user terminal received by the communication unit.

Preferably, the user model construction unit constructs a user model on the basis of the beam index in which small-scale fading of the reference signal received power for each location of the user terminal is the maximum from the constructed fingerprint data.

Preferably, the optimal beam index derivation unit derives, on the basis of a user model and a blockage model constructed using the received location information and data traffic of the at least one user terminal as inputs to the deep neural network, a beam in which small-scale fading of the reference signal received power of the user terminal corresponding to the data traffic is the maximum.

Preferably, the blockage model construction unit derives, from the constructed fingerprint data, a beam divergence angle generated at an azimuth and an elevation angle of each blockage located between the base station and the at least one user terminal, and constructs the blockage model on the basis of the reference signal received power changed depending on loss of small-scale fading of reference signal received power calculated for each cluster.

There is provided a deep learning-based beamforming communication method including driving an optimal beam index on the basis of deep learning in a beamforming communication system including a base station, multiple small base stations, and at least one user terminal, wherein the base station performs: receiving, at a communication step, location information and reference signal received power of the at least one user terminal via the small base stations in response to reference signals of the base station transmitted to the at least one user terminal via the small base stations; constructing, at a fingerprint DB construction step, fingerprint data on the basis of the location information and the reference signal received power of the at least one user terminal that are received; constructing, a user model construction step, a model on the basis of a beam index for each location of the user terminal, the beam index being derived from the fingerprint data; and deriving, from a deep neural network at an optimal beam index derivation step, the beam index in which strength of the received power for each location is the maximum.

Preferably, the base station further performs constructing a blockage model on the basis of the reference signal received power changed depending on each blockage located between the base station and the at least one user terminal at a blockage model construction step.

Preferably, the reference signals are periodically transmitted from the base station to the at least one user terminal found through exhaustive search, and are transmitted on the basis of a beamforming vector.

Preferably, the beamforming vector is a beam in which small-scale fading of the reference signal received power is the maximum in a codeword of a preset codebook.

Preferably, the reference signal received power is strength of a received signal derived by receiving and measuring, by the at least one user terminal, the reference signals transmitted from the base station.

Preferably, at the communication step, the location information and data traffic are received from the at least one user terminal and the optimal beam index derivation unit is requested for beam index information in which small-scale fading of the reference signal received power corresponding to each location of the user terminal is the maximum.

Preferably, at the communication step, a communication channel between the base station and the at least one user terminal is formed on the basis of the beam index derived at the optimal beam index derivation step.

Preferably, at the fingerprint DB construction step, the fingerprint data is constructed on the basis of the reference signal received power and the location information of the at least one user terminal that are received by the communication unit.

Preferably, at the user model construction step, a user model is constructed on the basis of the beam index in which small-scale fading of the reference signal received power for each location of the user terminal is the maximum from the constructed fingerprint data.

Preferably, at the optimal beam index derivation step, on the basis of a user model and a blockage model constructed using the received location information and data traffic of the at least one user terminal as inputs to the deep neural network, a beam in which small-scale fading of the reference signal received power of the user terminal corresponding to the data traffic is the maximum is derived.

Preferably, at the blockage model construction step, a beam divergence angle generated at an azimuth and an elevation angle of each blockage located between the base station and the at least one user terminal is derived from the constructed fingerprint data, and the blockage model is constructed on the basis of the reference signal received power changed depending on loss of small-scale fading of reference signal received power calculated for each cluster.

According to the present disclosure, in an indoor environment, fingerprint data is constructed using a beam index for each user terminal location on the basis of reference signal received power (RSRP) between a base station and a user terminal, the user model and the blockage model are constructed on the basis of the constructed fingerprint data, a deep neural network derives an beam index from the constructed user and blockage models for a location of a user terminal and data traffic, and communication between the base station and the user terminal is performed with the derived beam index, whereby path loss caused by a blockage can be minimized and high reliability and data transfer rate can be provided in a mobile communication environment.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, a deep learning-based beamforming communication system and method according to the present disclosure will be described in detail with reference to the accompanying drawings. In describing, thickness of lines or sizes of elements shown in the drawings may be exaggerated to be large for clarity of illustration and for convenience. Further, the terms described below are defined in consideration of the functions in the present disclosure, which may vary depending on the intention of the user, the operator, or the custom. Therefore, the definition of the terms should be based on the contents throughout this specification.

Objectives and effects of the present disclosure may be naturally understood or more apparent from the following description, and the objectives and the effects of the present disclosure are not limited to the following description. Also, in describing the present disclosure, if it is decided that a detailed description of the known art related to the present disclosure makes the subject matter of the present disclosure unclear, the detailed description will be omitted.

Figure 1:
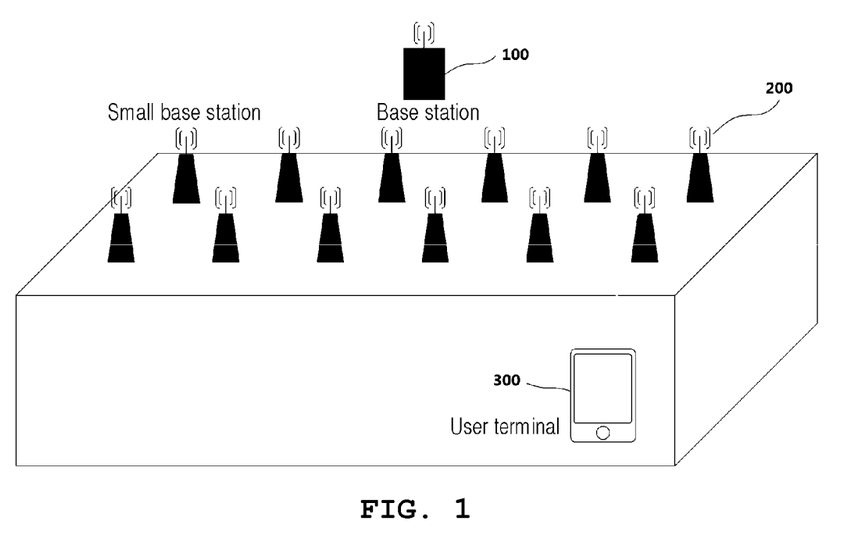
FIG. 1 is a diagram illustrating installation locations of small base stations and a beamforming communication environment between a user and the base stations in an indoor environment according to an embodiment of the present disclosure.

FIG. 1 is a diagram illustrating installation locations of small base stations and a beamforming communication environment between a user and the base stations in an indoor environment according to an embodiment of the present disclosure.

As shown in FIG. 1, a beamforming communication system in an indoor environment may include one base station 100 and millimeter-wave massive multi-input multi-output (MIMO) of N small base stations 200 composed of three sectors in an indoor structure. Therefore, the number of all sectors across the network may be M(=3N).

Each of the small base stations 200 communicates with one user terminal 300 with a single antenna, and may include $N_t(=N_h \times N_v)$ uniform antenna arrays (UPAs).

In addition, each of the small base station 200 may have one RF chain, and in downlink transmission, analog beamforming may be applied through a phase shifter. In downlink transmission, a transmission symbol vector $x_m$ of any small base station 200 may be represented as the following Equation.

$$x_m = F_m s_m \qquad \text{[Equation 1]}$$

In Equation 1, $F_m \in C^{1 \times N_t}$ and $s_m \in C$ are an analog beamforming vector and a data symbol of any small base station, respectively. A reception signal $y_m \in C$ of the user terminal 300 serviced from any small base station m 200 may be represented as the following Equation with a desired signal and an interference signal from a nearby base station i.

$$y_m = H_m F_m s_m + \sum_{i=1, i \neq m}^{M} H_i F_i s_i + n_m \qquad \text{[Equation 2]}$$

In Equation 2, $H_i \in C^{1 \times N_t}$ denotes a millimeter wave channel vector between a small base station i 200 and the user terminal 300, and $n_m$ denotes a receive noise with the average of 0 and the variance of $\sigma^2$.

At a transmission antenna port P determined by a communication standard protocol, reference signal received power may be calculated as the following Equation.

$$RSRP_P = PL \cdot SF \cdot \left( \sum_{u=1}^{U} |a_{0,u,p}|^2 \sum_{n=1}^{N} \sum_{m=1}^{M} |\alpha_{n,m,u,p}|^2 \right) \frac{P_{tx}}{U} \qquad \text{[Equation 3]}$$

In Equation 3, PL and SF denote path loss and shadowing caused by large-scale fading, respectively. $\alpha_{0,u,p}$ and $\alpha_{n,m,u,p}$ denote small-scale fading channel coefficients including beamforming of LOS and Non-LOS (NLOS), respectively. U denotes the number of antenna elements at a reception end, and $P_{tx}$ denotes transmission power of the base station.

Each of the small base station 200 performs beamforming by applying a codebook based on discrete Fourier transform (DFT). The DFT codebook is widely used in 3GPP Long-Term Evolution (LTE) and New Radio (NR). In the case of uniform linear array (ULA) having N antenna elements, the DFT codebook may represent the k-th beamforming vector as in the following Equation.

$$g_{ULA}(k) = \frac{1}{\sqrt{N_t}} \left[ 1, e^{j2\pi(N_t-1)\frac{k}{QN}} \right]^T \qquad \text{[Equation 4]}$$

In Equation 4, k=0, 1, ..., QN−1, and Q denotes an over sampling coefficient. In the case of UPA, the beamforming vector may be represented as the following Equation by using the Kronecker product of 1D beamforming vectors in the respective horizontal and vertical domains.

$$g_{UPA}(k,l) = g_{ULA}(k) \otimes g_{ULA}(l) \qquad \text{[Equation 5]}$$

In Equation 5, k=0, 1, ..., $QN_v$−1, l=0, 1, ..., $QN_h$−1 and $\otimes$ denotes the Kronecker product.

Each of the small base stations 200 may select a beam in which small-scale fading of reference signal received power is the maximum in codeword $g_n$, n=1, 2, ..., $N_{CB}$ of the codebook, as a beamforming vector through exhaustive search as follows.

$$F_m = \text{argmax} |H_m g_n|^2 \qquad \text{[Equation 6]}$$

The channel between each of the small base stations 200 and the user terminal 300 follows 3GPP SCM, which is a ray-based channel model that considers a spatial correlation between large-scale fading, small-scale fading, and each ray. Compared with other propagation channel models generally used, such as Saleh-Valenzuela (S-V) channel model, 3GPP SCM is more practical, but complex because each path is composed of multiple rays having unique characteristics.

The configuration of a 3GPP channel may be composed of three steps: high-level parameter, large-scale parameter, and small-scale parameter setting.

A channel modeling procedure is described in detail in 3GPP Specification 38.901, so a detailed description thereof will be omitted in the present disclosure.

In the present disclosure, an InH scenario is considered to determine a channel parameter, and a large-scale fading parameter may be summarized as in Table 1 below. In addition, the distribution of shadow fading is lognormal.

TABLE 1

A path loss and shadow fading model in the InH scenario

| LOS/NLOS | Path loss [dB] | Shadow fading [dB] |
|---|---|---|
| LOS | $PL_{LOS} = 32.4 + 17.3 \log_{10}(d) + 20 \log_{10}(f_c)$ | $\sigma_{SF} = 3$ |
| NLOS | $PL_{NLOS} = \max(PL_{LOS}, PL_{NLOS})$ $PL_{NLOS} = 17.3 + 38.3 \log_{10}(d) + 24.9 \log_{10}(f_c)$ | $\sigma_{SF} = 8.03$ |

$f_c$ denotes a frequency, and d denotes a distance between the small base station 200 and the user terminal 300.

In the case of small-scale fading, the channel impulse response between antennas for reception u and transmission S which corresponds to time t and delay τ may be represented as the following Equation.

$$H_{s,u}(\tau, t) = \sqrt{\frac{1}{K_{R+1}}} H_{s,u}^{NLOS}(\tau, t) + \sqrt{\frac{K_r}{K_{R+1}}} H_{s,u,1}^{LOS}(t)\delta(\tau - \tau_1) \quad \text{[Equation 7]}$$

In Equation 7, τ denotes a delay spread, $K_R$ denotes a Rician component, and $H_{s,u}^{NLOS}(\tau, t)$ and $H_{s,u,1}^{LOS}(t)\delta(\tau-t)$ denote NLOS and LOS channel coefficients, respectively.

Figure 2:
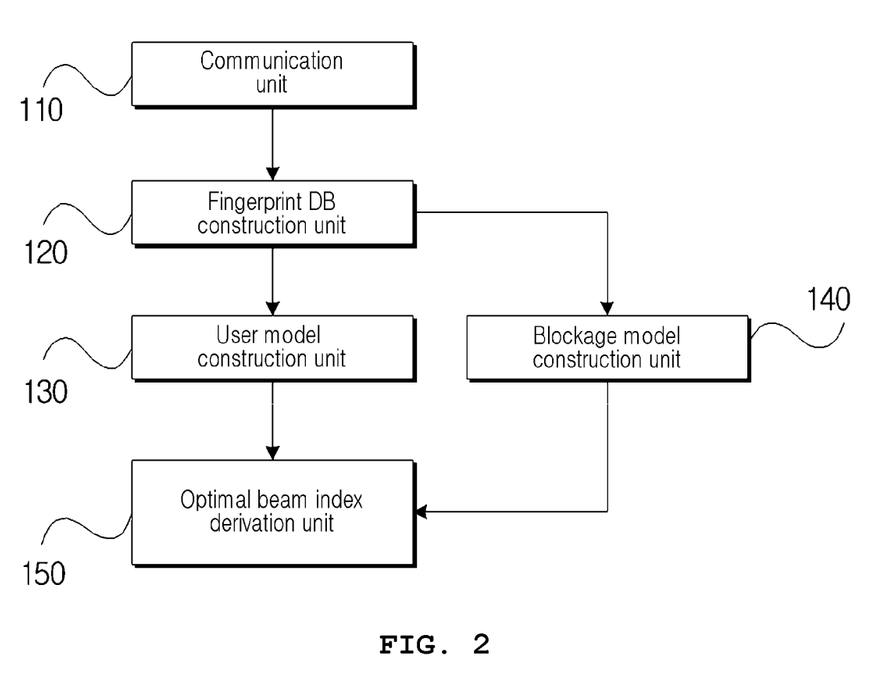
FIG. 2 is a configuration diagram illustrating a deep learning-based beamforming communication system according to an embodiment of the present disclosure.

FIG. 2 is a configuration diagram illustrating a deep learning-based beamforming communication system according to an embodiment of the present disclosure.

As shown in FIG. 2, the deep learning-based beamforming communication system may include a communication unit 110, a fingerprint DB construction unit 120, a user model construction unit 130, and an optimal beam index derivation unit 150, and may further include a blockage model construction unit 140.

The communication unit 110 receives, in response to reference signals transmitted from a base station to at least one user terminal, reference signal received power and location information from each user terminal and transmits the same to the fingerprint DB construction unit 120.

Herein, in order to construct fingerprint data, the base station 100 may perform beam sweeping based on exhaustive search, and may periodically transmit reference signals (RSs) to the user terminal 300 via a small base station through the DFT-based codebook.

The user terminal 300 may receive and measure the reference signals transmitted from the base station, and may derive reference signal received power, which is power when the reference signals are received.

Figure 3:
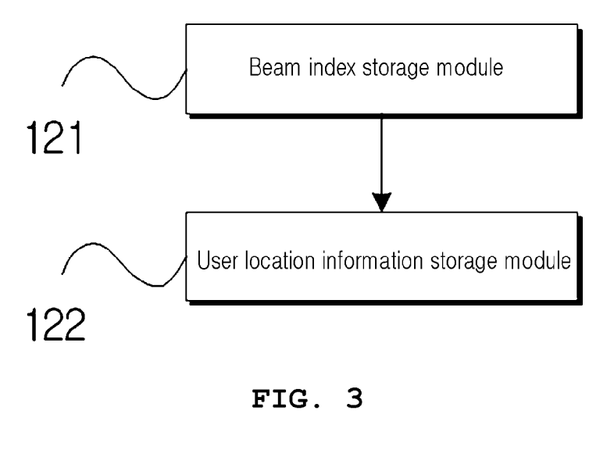
FIG. 3 is a detailed configuration diagram illustrating a fingerprint DB construction unit according to an embodiment of the present disclosure.

FIG. 3 is a detailed configuration diagram illustrating the fingerprint DB construction unit according to an embodiment of the present disclosure.

As shown in FIG. 3, the fingerprint DB construction unit 120 stores reference signal received power and location information of the user terminal that are received, in a beam index storage module 121 and a user location information storage module 122, respectively. Herein, regarding the location information of the user terminal, user location information may be easily identified using a built-in Global Positioning System (GPS) or network positioning system.

In addition, the fingerprint DB construction unit 120 may generate fingerprint data on the basis of reference signal received power for each location of each user terminal stored in the beam index storage module 121 and the user location information storage module 122.

The fingerprint DB construction unit 120 may transmit the constructed fingerprint data to the user model construction unit 130.

Figure 4:
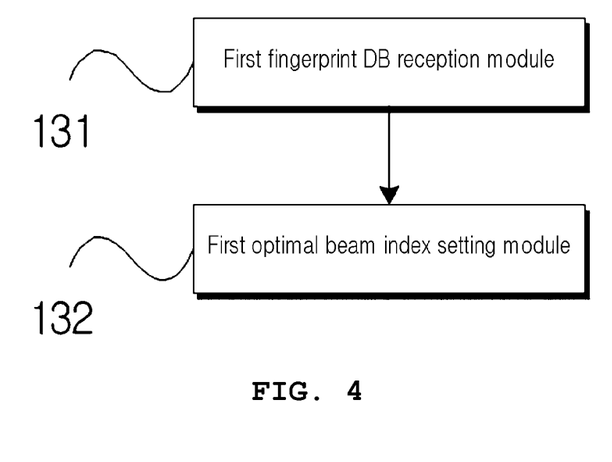
FIG. 4 is a detailed configuration diagram illustrating a user model construction unit according to an embodiment of the present disclosure.

FIG. 4 is a detailed configuration diagram illustrating the user model construction unit according to an embodiment of the present disclosure.

As shown in FIG. 4, the user model construction unit 130 may include a first fingerprint DB reception module 131 and a first optimal beam index setting module 132.

In the user model construction unit 130, the first fingerprint DB reception module 131 receives fingerprint data from the fingerprint DB construction unit 120, and the first optimal beam index setting module 132 sets, from the fingerprint data, a beam index in which small-scale fading of reference signal received power for each user location is the maximum.

Herein, reference signal received power may vary depending on the location of the user terminal, data traffic, and a blockage state in an indoor environment. That is, reference signal received power may vary according to data traffic and a blockage state that are based on the user location, and may vary according to time.

3GPP standardization may define two blockage models: a stochastic model and a geometric model.

The stochastic model may construct a 2D blockage that is randomly located near each user terminal 300.

A blockage may be defined using elevation and azimuthal angles and an angular span, and the effect of a blockage may be determined according to attenuation of each multi-path cluster dependent on the blockage.

The geometric model may define a 3D rectangular blockage, and attenuation of each sub-path may be determined by the knife edge diffraction model.

The stochastic model is intended to reduce modeling complexity through imitation into a 2D blockage area of a blockage.

Conversely, the geometric model considers the details of the size of a blockage and of how each sub-path is attenuated by a blockage. Therefore, in the present disclosure, the stochastic model may be applied to increase computational efficiency and the stochastic model is generally used.

In a 3GPP stochastic blockage model, both a self-blockage and a non-self-blockage may be considered.

For a self-blockage, there are a landscape mode and a portrait mode. When a human holds a mobile phone with a particular gesture, a self-blockage may be caused by the human. In a local coordinate system around a user, a blockage area may be represented with the central angle $\phi_0$, $\theta_0$ and the angular spread $x_0$, $y_0$ of the blockage in the azimuth and the elevation angle.

A non-self-blockage may be caused by nearby blockages, for example, humans and vehicle blockages, but only a blockage caused by a human is considered in the InH scenario.

In a global coordinate system, it is assumed that the azimuthal angles of a blockage are equally distributed in a range of [0°, 360°] and the elevation angle is fixed at 90°. It is assumed that the number of non-self-blockages is K=4, which may be changed in a particular scenario (e.g., high blockage density). In addition, it is assumed that the angular spreads are equal in a range of [15°, 45° ] and a range of [5°, 15° ] in the azimuth and the elevation angle, respectively. Main parameters of a self and a non-self-blockage are shown in Table 2.

TABLE 2

3GPP blockage model

| Blockage | Self-blockage (k = 0) | | Non-self-blockage |
| --- | --- | --- | --- |
| | Landscape mode | Portrait mode | (k = 1, 2, 3, 4) |
| Coordinate system | Local | Local | Global |
| $\phi_k$ | 260 | 40 | Uni. in [0°, 360°] |
| $x_k$ | 120 | 160 | Uni. In [5°, 15°] |
| $\theta_k$ | 100 | 110 | 90° |
| $y_k$ | 80 | 75 | Uni. In [5°, 15°] |
| Attenuation | 30 | 30 | Max. 20 |

In the present disclosure, blockage angles are $$\phi \in \left[\phi_k - \frac{x_k}{2}, \phi_k + \frac{x_k}{2}\right] \text{ and } \theta \in \left[\theta_k - \frac{y_k}{2}, \theta_k + \frac{y_k}{2}\right]$$

in the azimuth and the elevation angle, respectively.

Figure 5:
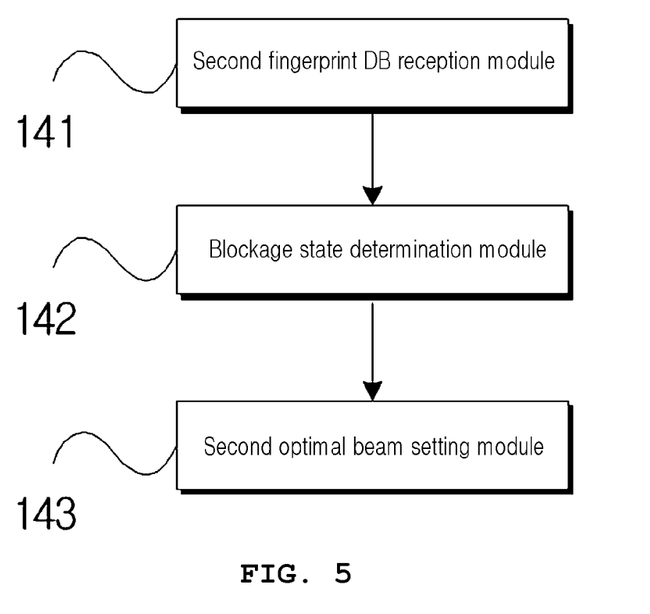
FIG. 5 is a detailed configuration diagram illustrating a blockage model construction unit according to an embodiment of the present disclosure.
Figure 6:
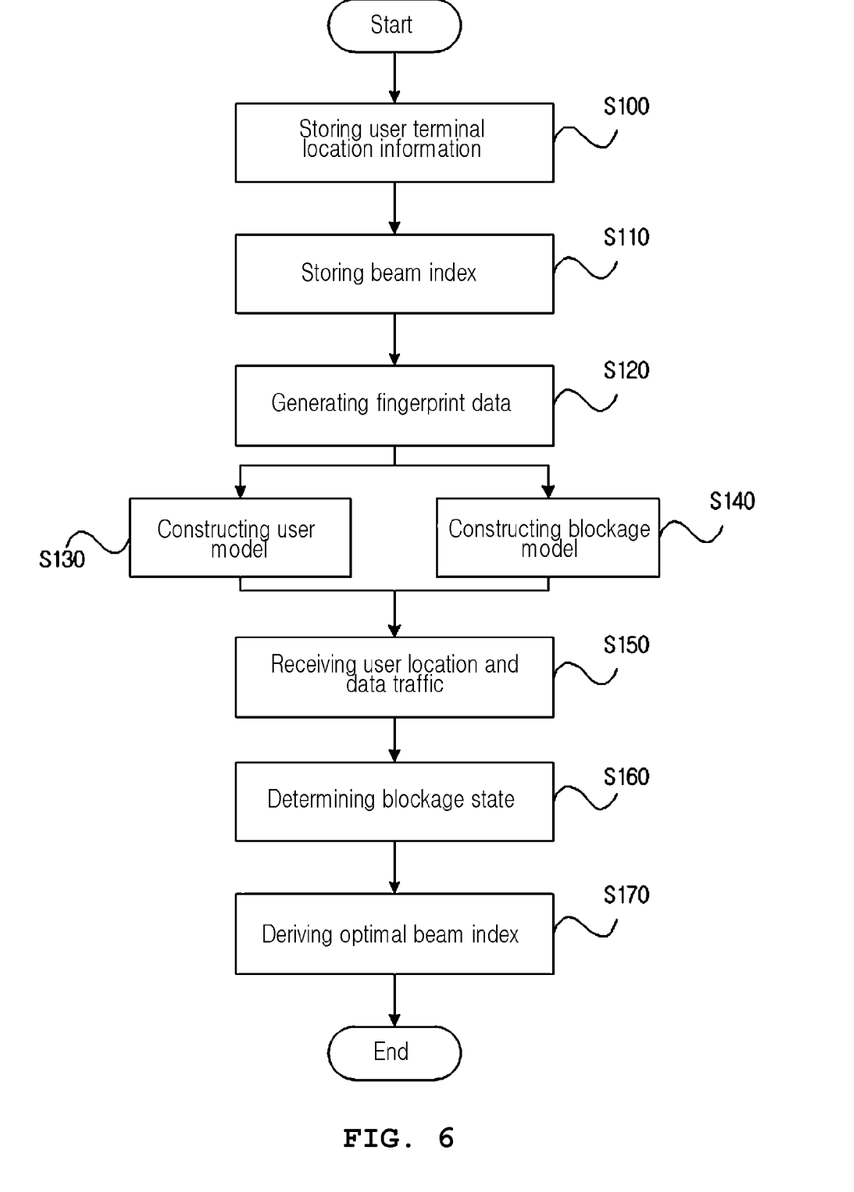
FIG. 6 is a flowchart illustrating a process of deriving an optimal beam in a deep learning-based beamforming communication method according to an embodiment of the present disclosure.

FIG. 5 is a detailed configuration diagram illustrating a blockage model construction unit according to an embodiment of the present disclosure.

As shown in FIG. 5, the blockage model construction unit 140 may include a second fingerprint DB reception module 141, a blockage state determination module 142, and a second optimal beam setting module 143.

In the blockage model construction unit 140, the second fingerprint DB reception module 141 may receive fingerprint data from the fingerprint DB construction unit 120. The blockage state determination module 142 may derive, on the basis of the received fingerprint data, a beam divergence angle that is generated at the azimuth and the elevation angle of each blockage located between the base station 100 and the user terminal, and may determine a blockage state according to the loss of small-scale fading of reference signal received power calculated for each cluster.

Herein, the loss caused by a self-blockage may be attenuation of −30 dB for each cluster, and attenuation caused by a non-self-blockage may be represented as the following Equation.

$$L_{dB} = -20 \log_{10}(1-(F_{A_1}+F_{A_2})(F_{Z_1}+F_{Z_2}))$$ [Equation 8]

In Equation 8, $F_{A_1|A_2|Z_1|Z_2}$ may be represented as the following Equation.

$$F_{A_1|A_2|Z_1|Z_2} = \frac{\tan^{-1}\left(\pm\frac{\pi}{2}\sqrt{\frac{\pi}{\lambda}r\left(\frac{1}{\cos(A_1|A_2|Z_1|Z_2)}-1\right)}\right)}{\pi}$$ [Equation 9]

In Equation 9, λ denotes a wavelength, r denotes a distance between the user terminal 300 and a blockage, and $A_1|A_2|Z_1|Z_2$ denote azimuthal angles As and elevation angles Zs, respectively.

Most existing studies assumed that when a blockage is on an LOS path, a link is blocked and the blocked link is NLOS, but in practice, a blockage may block only a part of a multi-path component and a direct path does not necessarily need to be blocked.

However, tracking an exact propagation trajectory of each multi-path component requires a high computational cost, so the 3GPP stochastic blockage model maintains an appropriate balance between modeling complexity and accuracy.

When the blockage state determination module 142 determines that reference signal received power affected by a blockage is lower that of the beam index in which small-scale fading of reference signal received power is the maximum, which is constructed by the user model construction unit 130, the second optimal beam setting module 143 sets a beam index in which small-scale fading of reference signal received power changed considering the blockage at the location of the user terminal is the maximum, as an optimal beam index.

The communication unit 110 may receive location information and data traffic from at least one user terminal 300, and may request the optimal beam index derivation unit 150 for reference signal received power for each location of each user terminal corresponding to the received data traffic.

The optimal beam index derivation unit 150 may derive, on the basis of a user model and a blockage model constructed using the location information and the data traffic of each user terminal as inputs to a deep neural network, a beam index in which small-scale fading of reference signal received power is the maximum at the location of at least one user terminal corresponding to the data traffic. The deep neural network may learn the derived beam index.

The communication unit 110 may form a communication channel between the base station 100 and the user terminal 300 on the basis of the derived beam index in which small-scale fading of reference signal received power is the maximum.

That is, the deep neural network may derive, from the user model and the blockage model constructed for the location information and the data traffic of at least one user terminal 300, a beam index in which small-scale fading of reference signal received power is the maximum, and may learn the derived beam index so that the communication unit may form a communication channel with the optimal beam index considering a blockage state at the location of each user terminal.

More specifically, a codebook size |g| is for beam prediction, and a value of 2 is for blockage prediction. To this end, a deep neural network completely connected to one input layer, L-2 hidden layers, and one output layer may be considered.

Input values of the deep neural network are the location $P_u=[x_u, y_u]$ of the user terminal 300 and data traffic λ. The location of the user terminal is normalized according to the location $P_m=[x_m, y_m]$ of the small base station m 200, and may be represented as the following Equation.

$$\overline{P}_u = [\overline{x}_u, \overline{y}_u] = [x_m-x_u, y_m-y_u]$$ [Equation 10]

Data traffic may be classified into three classes: low (−1), medium (0), and high (1).

In each hidden layer, a rectified linear unit (ReLU) function may be applied as an activation function, and a dropout layer may be added to avoid overfitting during training. In addition, the number of outputs of each prediction (beam or blockage) may vary according to the number of classes.

That is, the output layer of the deep neural network may be determined by target prediction. In the case of beam prediction, the output layer may be applied with a layer completely connected using neurons of D=|g| and a softmax activation function, and an output value may be calculated as follows.

$$P_d = \frac{e^{z_d}}{\sum_{i=1}^{D} e^{z_d}} \quad \text{[Equation 11]}$$

In Equation 11, $z_i$, i=1, 2, . . . , D denotes the i-th element of a D-dimensional vector, and denotes the probability that the d-th beamforming vector is predicted. Finally, an index of the element having the highest probability may be selected as a predicted beamforming index. In the case of blockage prediction, there are neurons of D=2, and two probabilities corresponding to a blockage $p_1$ and a non-blockage $p_2$ may be calculated.

The final output value $\tilde{y}$ of the deep neural network may be converted to a series of input values x and may be represented as the following Equation.

$$\tilde{y} = g_{L-1}( \ldots g_1(x;\theta_1);\theta_{L-1}) \quad \text{[Equation 12]}$$

In Equation 12, $\theta_l = \{W_l, c_l\}$ denotes a parameter of the l-th layer. The parameter to be optimized is defined as $\theta = \{\theta_l\}_{l=1}^{L-1}$, which is optimized through learning of deep neural network Herein, learning of the deep neural network may be trained in such a manner that the loss function is minimized, and cross-entropy is used as the loss function, which may be represented as the following Equation.

$$L_{cross} = -\sum_{d=1}^{D} t_d \log_2(p_d) \quad \text{[Equation 13]}$$

In Equation 13, $t=[t_1, \ldots, t_D]$ denotes a target vector and $p=[p_1, \ldots, p_D]$ denotes network prediction.

In the InH scenario according to an embodiment of the present disclosure, small base stations 200 of which an inter-site distance (ISD) is 20 m may be installed on the ceiling in an indoor space. The height of each of the small base stations 200 is 3 m, and user terminals 300 may be equally distributed.

A parameter used in the InH scenario according to an embodiment of the present disclosure is set based on bandwidth 199 MHz of carrier frequency 30 GHz corresponding to the 3GPP NR system, and detailed parameters are shown in Table 3.

TABLE 3

Simulation parameter

| Parameter | Contents |
|---|---|
| Scenario | Indoor hotspot |
| Carrier frequency | 30 GHz |
| Bandwidth | 100 MHz |
| Room size (W × L × H) | 120 m × 50 m × 3 m |
| ISD | 20 m |
| Base station Tx signal strength | 24 dBm |
| Base station antenna height | 3 m |
| Base station antenna configuration | 8 × 8 |
| User terminal height | 1 m |
| User terminal antenna configuration | Single antenna |
| User terminal antenna pattern | Isotropic |
| User terminal noise | 9 dB |
| User terminal distribution | Equal distribution |

According to an embodiment of the present disclosure, the deep neural network having five hidden layers and neurons of $M_{NN}=2048$ for each layer is applied, and detailed hyper-parameters are shown in Table 4.

TABLE 4

Deep neural network hyper-parameter

| Parameter | Beam prediction | Blockage prediction |
|---|---|---|
| Learning rate | 0.1 | 0.1 |
| Dropout | 0.9 | 0.9 |
| Normalization | $l_2$ | $l_2$ |
| Maximum epoch number | 100 | 50 |
| Data size | 18,000 | 18,000 |
| Data partitioning | 70:30 | 70:30 |

The proposed prediction method analyzes performance through Top-1 and Top-n classification accuracy and may be represented as follows.

$$A_{TOP-1} = \frac{1}{N_{test}} \sum_{n=1}^{N_{test}} 1_{\hat{d}_n = d_n^*} \quad \text{[Equation 14]}$$

In Equation 14, $1_{(\cdot)}$ denotes an indicator function, and $\hat{d}_n$ and $d_n^*$ denote prediction and target classes of the n-th test point, respectively. Top-n accuracy is a case of prediction among n millimeter wave beams. In addition, performance may be analyzed for spectral efficiency by using the predicted beam.

Figure 7:
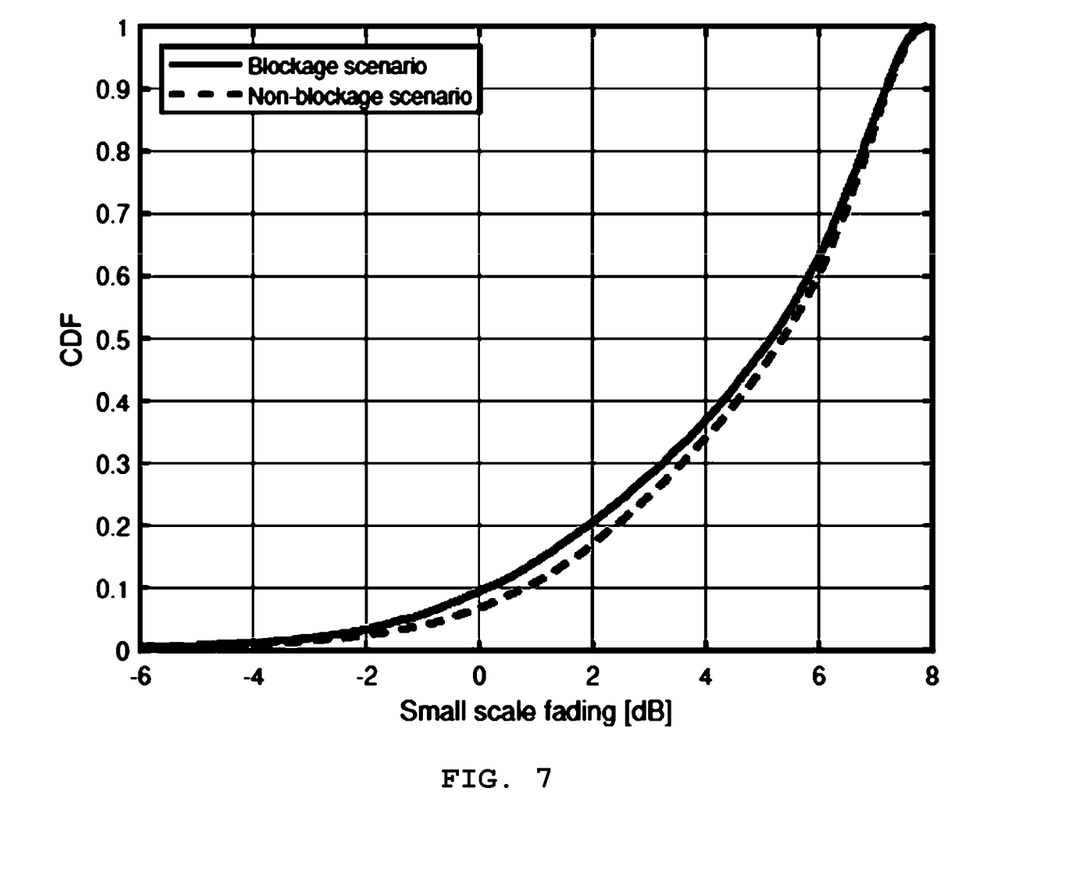
FIG. 7 is a graph illustrating comparison between cumulative distribution functions of small-scale fading of reference signal received power in blockage and non-blockage scenarios according to an embodiment of the present disclosure.

FIG. 7 is a graph illustrating comparison between cumulative distribution functions of small-scale fading of reference signal received power in blockage and non-blockage scenarios according to an embodiment of the present disclosure.

The main causes of blockage in an indoor environment may be blockages, such as humans and nearby users, and accordingly, a cumulative distribution function (CDF) of small-scale fading of reference signal received power may be represented.

Herein, in a blockage scenario, a self-blockage and non-self-blockages of K=4 may be considered. With respect to the cumulative distribution function of a value of 0.2, it is found that loss of about 0.5 dB occurred due to blockages.

Figure 8:
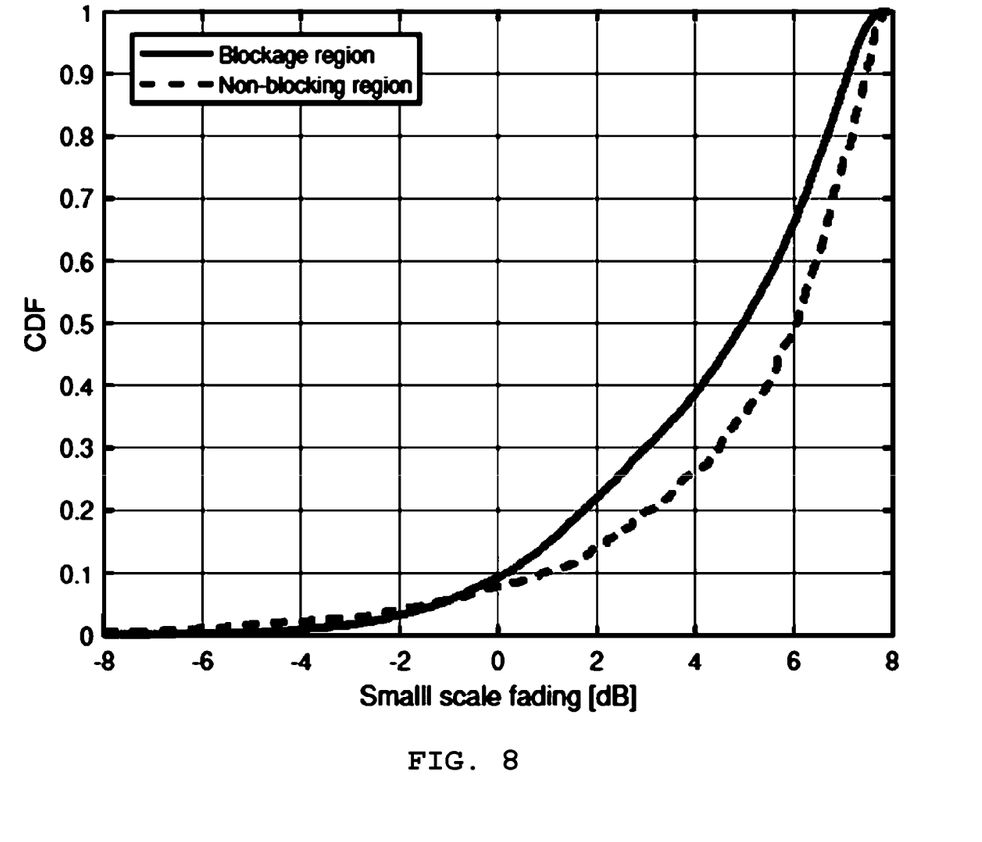
FIG. 8 is a graph illustrating comparison between cumulative distribution functions of small-scale fading of reference signal received power to which self and non-self-blockages are applied, according to an embodiment of the present disclosure.

FIG. 8 is a graph illustrating comparison between cumulative distribution functions of small-scale fading of reference signal received power to which self and non-self-blockages are applied, according to an embodiment of the present disclosure.

Herein, in the blockage scenario, attenuation caused by a self-blockage (−30 dB) and non-self-blockages of K=4 (a maximum of −20 dB) may be applied to each cluster. In a non-blockage area, attenuation was 0 dB.

Figure 9:
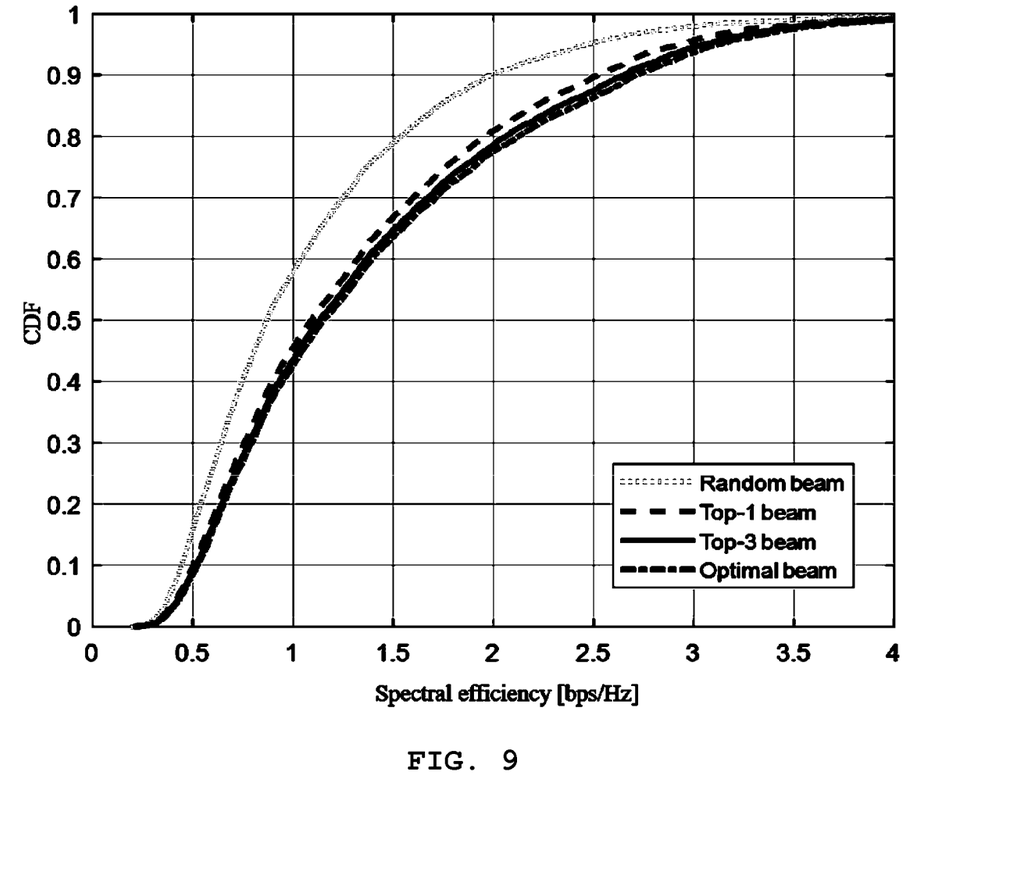
FIG. 9 is a graph illustrating comparison between Top-1 and Top-3 beam prediction accuracy for training sets in various sizes according to an embodiment of the present disclosure.

FIG. 9 is a graph illustrating comparison between Top-1 and Top-3 beam prediction accuracy for training sets in various sizes according to an embodiment of the present disclosure.

It is found that the proposed deep neural network has a high prediction accuracy based on a user location and data traffic, which had the accuracy of 83 and 94% for Top-1 and Top-3, respectively.

Figure 10:
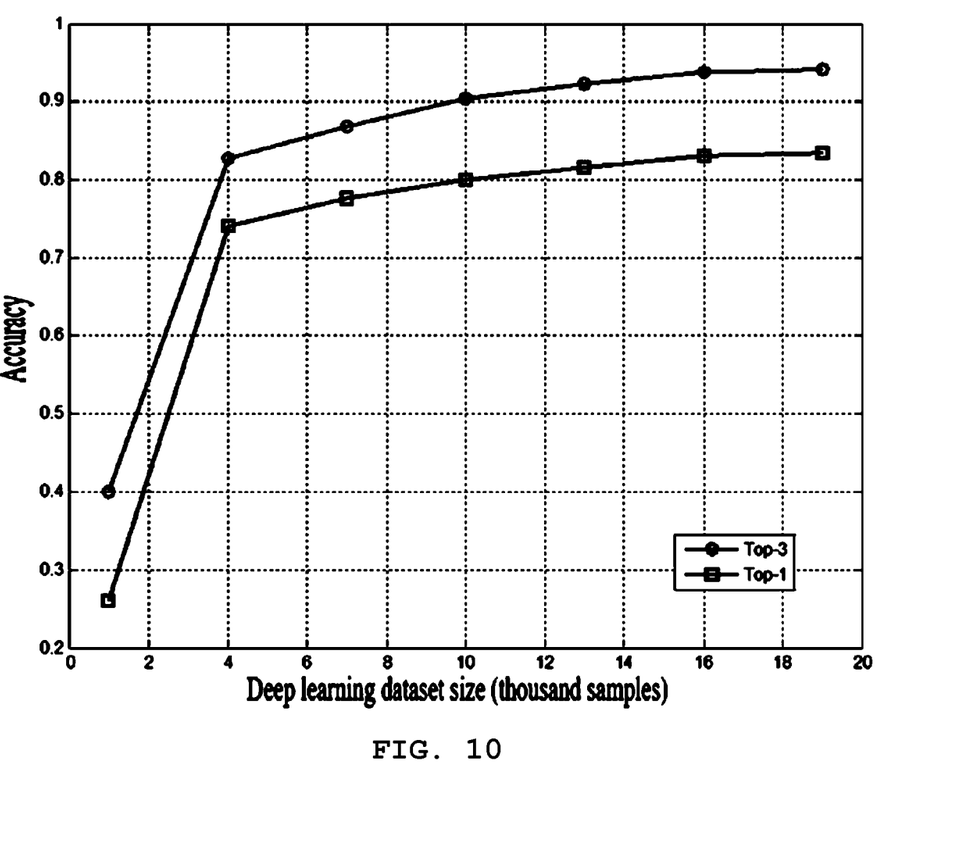
FIG. 10 is a graph illustrating CDFs of spectral efficiency according to an embodiment of the present disclosure.

FIG. 10 is a graph illustrating CDFs of spectral efficiency according to an embodiment of the present disclosure.

As shown in FIG. 10, the signal-to-interference-plus-noise ratio (SINR) expressing, in decibels, the ratio of received signal power to the sum of interference power and noise power in order to calculate spectral efficiency may be represented as the following Equation.

$$\text{SINR} = \frac{10^{\frac{\xi_m}{10}}}{\left(\sum_{i \in M} 10^{\frac{\xi_m}{10}}\right) - 10^{\frac{\xi_m}{10}} + N_0} \quad \text{[Equation 15]}$$

In Equation $\xi_i$ denotes reference signal received power of the i-th base station, and $N_0$ denotes a noise power level. From the result of FIG. 10, it is found that the spectral efficiency average values of an optimal beam, a Top-3 beam, a Top-1 beam, and a random beam are 1.41, 1.38, 1.32, and 1.08, respectively, and that Top-1 prediction has the performance of 94% compared to beam selection in terms of average spectral efficiency.

Figure 11:
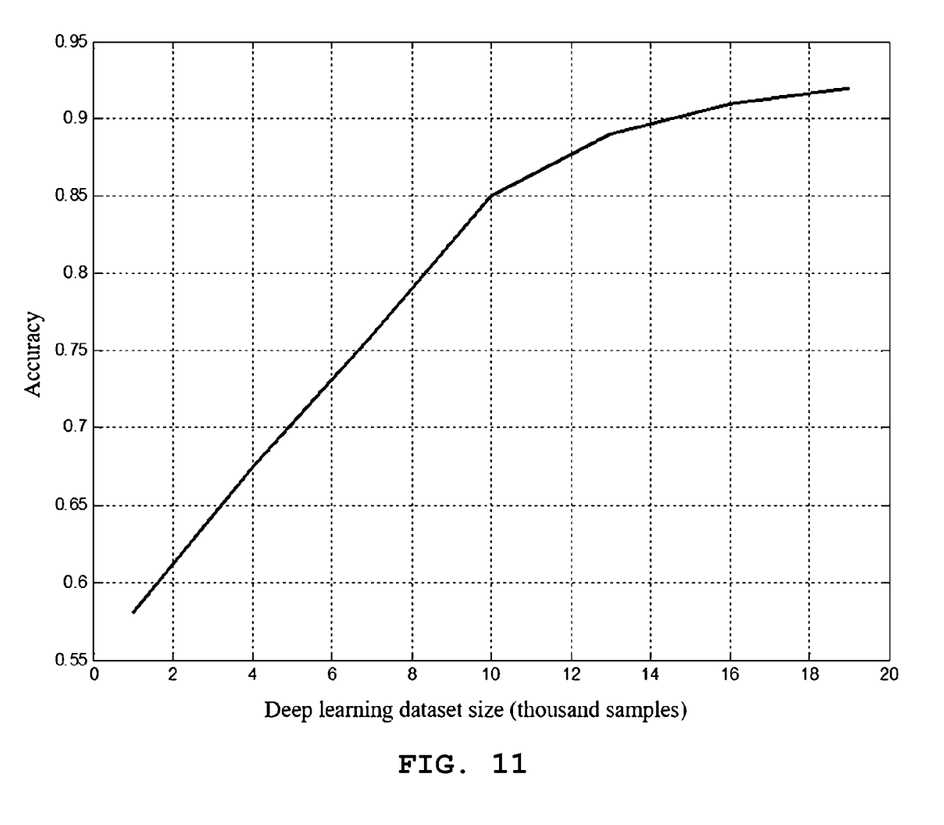
FIG. 11 is a graph illustrating accuracy of a deep learning-based beamforming communication system and method according to an embodiment of the present disclosure.

FIG. 11 is a graph illustrating accuracy of a deep learning-based beamforming communication system and method according to an embodiment of the present disclosure.

As shown in FIG. 11, with a sufficient size of (more than 16,000) data sets, a beam and a blockage are predicted with accuracy of 90% or more according to a user location and data traffic. This shows improvement in reliability and a data transfer rate of a next-generation millimeter wave system.

Although exemplary embodiments of the present disclosure have been described in detail, it will be understood by those skilled in the art that various changes may be made without departing from the scope of the present disclosure. Therefore, the scope of the present disclosure should not be defined as being limited to the embodiments, but should be defined by all changes and modifications that are derived from the appended claims and equivalents thereof.

What is claimed is:

1. A deep learning-based beamforming communication system, comprising:
    a base station;
    multiple small base stations installed at predetermined indoor locations and communicating with the base station; and
    at least one user terminal communicating with the small base stations,
    wherein the base station comprises a communication unit receiving location information and reference signal received power of the at least one user terminal via the small base stations in response to reference signals of the base station transmitted to the at least one user terminal via the small base stations, and wherein the base station:
    constructs fingerprint data on the basis of the location information and the reference signal received power of the at least one user terminal received by the communication unit;
    constructs a model on the basis of a beam index for each location of the user terminal, the beam index being derived from the fingerprint data; and
    derives, from a deep neural network, the beam index in which strength of the received power for each location is the maximum,
    wherein the reference signals are periodically transmitted from the base station to the at least one user terminal found through exhaustive search, and are transmitted on the basis of a beamforming vector,
    wherein the beamforming vector is a beam in which small-scale fading of the reference signal received power is the maximum in a codeword of a preset codebook.

2. The system of claim 1, wherein the base station further constructs a blockage model on the basis of the reference signal received power changed depending on each blockage located between the base station and the at least one user terminal.

3. The system of claim 1, wherein the reference signal received power is strength of a received signal derived by receiving and measuring, by the at least one user terminal, the reference signals transmitted from the base station.

4. The system of claim 1, wherein the communication unit receives the location information and data traffic from the at least one user terminal and requests beam index information in which small-scale fading of the reference signal received power corresponding to each location of the user terminal is the maximum.

5. The system of claim 1, wherein the communication unit forms a communication channel between the base station and the at least one user terminal on the basis of the derived beam index.

6. The system of claim 1, wherein the base station constructs the fingerprint data on the basis of the reference signal received power and the location information of the at least one user terminal received by the communication unit.

7. The system of claim 1, wherein the base station constructs a user model on the basis of the beam index in which small-scale fading of the reference signal received power for each location of the user terminal is the maximum from the constructed fingerprint data.

8. The system of claim 1, wherein the base station derives, on the basis of a user model and a blockage model constructed using the received location information and data traffic of the at least one user terminal as inputs to the deep neural network, a beam in which small-scale fading of the reference signal received power of the user terminal corresponding to the data traffic is the maximum.

9. The system of claim 2, wherein the base station derives, from the constructed fingerprint data, a beam divergence angle generated at an azimuth and an elevation angle of each blockage located between the base station and the at least one user terminal, and constructs the blockage model on the basis of the reference signal received power changed depending on loss of small-scale fading of reference signal received power calculated.

10. A deep learning-based beamforming communication method, comprising:
    driving an optimal beam index on the basis of deep learning in a beamforming communication system including a base station, multiple small base stations, and at least one user terminal,
    wherein the base station performs:
    receiving, at a communication step, location information and reference signal received power of the at least one user terminal via the small base stations in response to reference signals of the base station transmitted to the at least one user terminal via the small base stations;
    constructing, at a fingerprint DB construction step, fingerprint data on the basis of the location information and the reference signal received power of the at least one user terminal that are received;
    constructing, a user model construction step, a model on the basis of a beam index for each location of the user terminal, the beam index being derived from the fingerprint data; and
    deriving, from a deep neural network at an optimal beam index derivation step, the beam index in which strength of the received power for each location is the maximum, wherein the reference signals are periodically transmitted from the base station to the at least one user terminal found through exhaustive search, and are transmitted on the basis of a beamforming vector, wherein the beamforming vector is a beam in which small-scale fading of the reference signal received power is the maximum in a codeword of a preset codebook.

11. The method of claim 10, wherein the base station further performs constructing a blockage model on the basis of the reference signal received power changed depending on each blockage located between the base station and the at least one user terminal at a blockage model construction step.

12. The method of claim 10, wherein the reference signal received power is strength of a received signal derived by receiving and measuring, by the at least one user terminal, the reference signals transmitted from the base station.

13. The method of claim 10, wherein at the communication step, the location information and data traffic are received from the at least one user terminal and beam index information is requested in which small-scale fading of the reference signal received power corresponding to each location of the user terminal is the maximum.

14. The method of claim 10, wherein at the communication step, a communication channel between the base station and the at least one user terminal is formed on the basis of the beam index derived at the optimal beam index derivation step.

15. The method of claim 10, wherein at the fingerprint DB construction step, the fingerprint data is constructed on the basis of the reference signal received power and the location information of the at least one user terminal that are received.

16. The method of claim 10, wherein at the user model construction step, a user model is constructed on the basis of the beam index in which small-scale fading of the reference signal received power for each location of the user terminal is the maximum from the constructed fingerprint data.

17. The method of claim 10, wherein at the optimal beam index derivation step, on the basis of a user model and a blockage model constructed using the received location information and data traffic of the at least one user terminal as inputs to the deep neural network, a beam in which small-scale fading of the reference signal received power of the user terminal corresponding to the data traffic is the maximum is derived.

18. The method of claim 11, wherein at the blockage model construction step, a beam divergence angle generated at an azimuth and an elevation angle of each blockage located between the base station and the at least one user terminal is derived from the constructed fingerprint data, and the blockage model is constructed on the basis of the reference signal received power changed depending on loss of small-scale fading of reference signal received power calculated.

* * * * *